(12) United States Patent
Roberge et al.

(10) Patent No.: US 8,627,767 B2
(45) Date of Patent: Jan. 14, 2014

(54) APPARATUS FOR FORMING A UNITARY BALE OF AGRICULTURAL OR FORESTRY BIOMASS WITH SUCCESSIVE HORIZONTALLY COMPACTED LAYERS

(75) Inventors: Martin J. Roberge, Saskatoon (CA); Kevin S. Richman, Plainfield, IL (US)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 13/817,986

(22) PCT Filed: Aug. 24, 2011

(86) PCT No.: PCT/US2011/048973
§ 371 (c)(1),
(2), (4) Date: Feb. 20, 2013

(87) PCT Pub. No.: WO2012/027475
PCT Pub. Date: Mar. 1, 2012

(65) Prior Publication Data
US 2013/0145940 A1 Jun. 13, 2013

Related U.S. Application Data

(60) Provisional application No. 61/402,123, filed on Aug. 24, 2010.

(51) Int. Cl.
*A01F 15/10* (2006.01)
*A01F 15/02* (2006.01)
(52) U.S. Cl.
CPC ............... *A01F 15/02* (2013.01); *A01F 15/10* (2013.01)
USPC ............ 100/215; 100/100; 100/210; 100/226

(58) Field of Classification Search
USPC .......... 100/100, 155 R, 179, 188 R, 214, 215, 100/218, 226, 245, 210; 414/483; 56/16.6, 56/28, 341, 344, 345, 346
See application file for complete search history.

(56) References Cited

U.S. PATENT DOCUMENTS

| | | | |
|---|---|---|---|
| 3,720,052 | A | 3/1973 | Anderson et al. |
| 3,901,142 | A | 8/1975 | Wood |
| 3,907,139 | A | 9/1975 | Luscombe |
| 3,911,654 | A | 10/1975 | Darnall et al. |
| 3,922,838 | A | 12/1975 | Kline et al. |
| 4,060,028 | A | 11/1977 | Luscombe |

(Continued)

FOREIGN PATENT DOCUMENTS

| | | |
|---|---|---|
| DE | 3407353 | 8/1985 |
| EP | 0421043 | 4/1991 |

*Primary Examiner* — Jimmy T Nguyen
(74) *Attorney, Agent, or Firm* — Rebecca Henkel

(57) ABSTRACT

The apparatus forms a unitary bale of agricultural or forestry biomass of uniform density and having a level top. The apparatus includes packer apparatus configured and supported in the chamber for reciprocating movement through a compacting chamber and progressive movement upwardly to form the bale. A crop deflector is supported in the chamber above the packer apparatus for deflecting a stream of the biomass downwardly, and is configured and operable so as to move continuously with the packer apparatus between the ends of the chamber and to substantially constantly reconfigure as a function of a position of the packer apparatus and a direction of the movement thereof so as to deflect the stream of the biomass directly in a path of the packer apparatus in the current direction of the movement thereof so as to be immediately compacted thereby onto the floor or the bale.

19 Claims, 13 Drawing Sheets

(56) References Cited

U.S. PATENT DOCUMENTS

| | | |
|---|---|---|
| 5,735,195 A | 4/1998 | Hewitt et al. |
| 6,530,199 B1 | 3/2003 | Covington et al. |
| 6,536,197 B1 | 3/2003 | Covington et al. |
| 6,536,836 B1 | 3/2003 | Henning |
| 6,682,417 B2 | 1/2004 | Covington et al. |
| 7,059,242 B2 * | 6/2006 | Lemke et al. ................. 100/226 |
| 7,178,454 B2 * | 2/2007 | Covington et al. ........... 100/226 |
| 7,267,051 B2 * | 9/2007 | Richman et al. .............. 100/215 |
| 7,281,471 B2 * | 10/2007 | Meeks et al. .................. 100/226 |
| 7,677,169 B2 * | 3/2010 | Covington et al. ............. 100/35 |

* cited by examiner

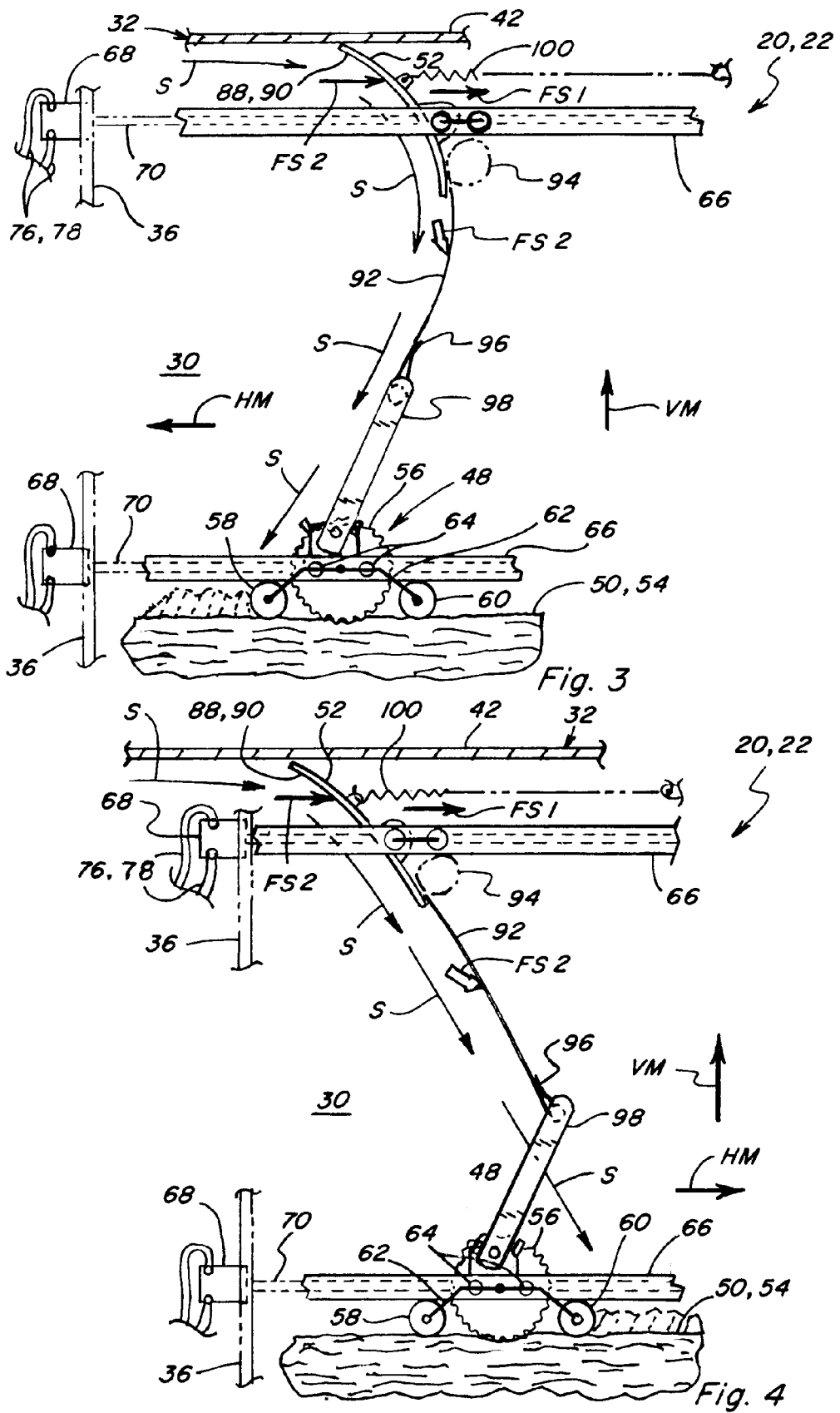

APPARATUS FOR FORMING A UNITARY BALE OF AGRICULTURAL OR FORESTRY BIOMASS WITH SUCCESSIVE HORIZONTALLY COMPACTED LAYERS

This application claims the benefit of U.S. Provisional Application No. 61/402,123, filed Aug. 24, 2010.

TECHNICAL FIELD

This invention relates generally to apparatus for forming a bale of agricultural or forestry biomass, and more particularly, which does so by compacting successive layers of the biomass in a uniform manner, to produce a unitary bale of consistent high density.

BACKGROUND ART

The disclosure of U.S. Provisional Application No. 61/402,123, filed Aug. 24, 2010, is hereby incorporated herein in its entirety by reference.

It is difficult to chop and pack efficiently agricultural biomass material (like sugarcane billets, straw or grass silage) or forestry biomass (wood chips). If the biomass, as an example cane billets harvested with a sugarcane harvester, is harvested as chopped material (billets of approximately 10 cm), there is a need for many trucks or trailers to follow the forage harvester. However, this creates traffic and soil compaction and valuable juice can be lost on the ground.

The objective of this large-scale chopped biomass harvesting (in bulk) is typically to chop the material, keep the juice (like for sugarcane harvesting), pack it only once in a rectangular bale and transport it with minimum disturbance and maximum density. One known option for packing is to compact the material repeatedly with a horizontal plunger from the top (like packing a cotton module). However, to bale a large bale, e.g., 8 foot by 8 foot, horizontally using such conventional vertical plunger would be difficult to obtain a high crop density. So packing in successive horizontal layers and using gravity force (like packing bunker silos) is believed to be more realistic.

Apparatus configured and operable for packing crop material, and particularly hay, in successive horizontal layers are well known. One known device is disclosed in Luscombe U.S. Pat. No. 3,907,139, issued Sep. 23, 1975, entitled Stack Forming Device. This device utilizes a horizontal compaction roller supported on guide structure supported from cables. In operation, the roller moves end to end along the guide structure through a stack forming chamber, to compact the crop material into the stack. However, the device relies on the weight of the roller and guide structure alone to provide the compacting force. This can limit the density of packing that can be achieve using that device. Also, because the support structure is supported by flexible cables, it can easily tilt and result in an uneven stack. Also, the roller of the Luscombe device is relatively large in diameter, and the edges of the guide structure occupy the peripheral regions of the chamber, such that the periphery of the stack may not be well compacted.

Another known stack forming device is disclosed in Kline et al. U.S. Pat. No. 3,922,838, issued Dec. 2, 1975, and entitled Machine For Forming A Compact Stack Of Crop Material. This device utilizes a shaped packing roll supported on a carriage frame within a stack forming chamber and movable along a curved path end to end within the chamber for forming a crowned stack. The packing roll is supported by walls of the chamber, and cylinders are provided for raising and lowering the walls and driving the packing roll against the stack for better compaction. The Kline et al. device also includes a baffle member in connection with the packing roll operable for deflecting an incoming flow of crop material downwardly onto the stack being formed, which is described as being and movable from time to time for distributing the crop material onto the stack. However, the Kline et al. device forms a crowned stack which is larger in the middle and no manner for distributing the crop material to form a level stack is disclosed.

Therefore, what is sought is apparatus for forming a unitary bale of agricultural or forestry biomass, capable of forming a bale of substantially uniform density and having a level top, which overcomes one or more of the shortcomings and limitations set forth above.

SUMMARY OF THE INVENTION

What is disclosed is apparatus for forming a unitary bale of agricultural or forestry biomass, capable of forming a bale of substantially uniform density and having a level top, which overcomes one or more of the shortcomings and limitations set forth above. The invention also has utility for forming bales of crop material such as cotton, and thus the term "biomass" should be interpreted broadly to include that and other balable plant materials.

According to a preferred aspect of the invention, the apparatus includes a mobile structure having a floor and upstanding walls defining a compacting chamber, and an inlet in an upper region of one end of the structure configured for receiving a substantially continuous stream of the agricultural or forestry biomass for flow along a path through the chamber from the one end toward a second end opposite the one end. The apparatus also includes packer apparatus configured and supported in the chamber for reciprocating movement through the chamber between the one end to the second end and progressive movement upwardly within the chamber, for compacting the biomass against the floor for forming the bale. A crop deflector is supported in the chamber above the packer apparatus for deflecting the stream of the biomass downwardly, and is configured and operable so as to move continuously with the packer apparatus between the ends of the chamber and to substantially constantly reconfigure as a function of a position of the packer apparatus and a direction of the movement thereof so as to deflect the stream of the biomass directly in a path of the packer apparatus in the current direction of the movement thereof so as to be immediately compacted thereby onto the floor or the bale. As an attendant result, the incoming stream of biomass is continuously and immediately compacted into the bale, such that each layer of the bale will be flat and of uniform density. Additionally, there will be less tendency and occurrence of build up of the biomass behind the packer apparatus as it moves through the chamber, and accumulation at the ends of the chamber from movement up or down hills.

According to another preferred aspect of the invention, the crop deflector has a crop deflecting surface positioned and configured to be impinged by the stream of the biomass, so as to deflect and guide the stream downwardly, and the reconfiguration of the deflector comprises changing a vertical extent of the crop deflecting surface. The position of the packer apparatus can be a vertical position and/or a horizontal position.

As another preferred aspect of the invention, the crop deflecting surface is configured and operable to be extendable and retractable for varying the vertical extent thereof, with vertical and horizontal movement of the packer apparatus. As a preferred example, the crop deflector can comprise a flexible roll up tarp or sheet, e.g., of a durable rubbery or canvas material, which can be biased toward the retracted or raised position, as a non-limiting example, such as using a spring or springs. Additionally, a bottom portion of the crop deflector can be attached to the packer apparatus, such as, but not limited to, using chains, cables, or linkages, so as to automatically roll out when the packer apparatus is farther from the upper end of the deflector, e.g., lower in the chamber, and retracted when closer to the upper end, e.g., higher in the chamber. Linkages provided can also be configured to advantageously automatically position the lower end of the deflector above or in other desired relation to the packer apparatus during the movements thereof, for directing the biomass stream in the path of movement of the packer apparatus.

According to another preferred aspect of the invention, the crop deflector will have a crop deflecting surface positioned and configured to be impinged by the stream of the biomass and to deflect and guide the stream downwardly, and the reconfiguration can include changing a shape of that surface. As a non-limiting example, a biasing element or elements can be provided in connection with the crop deflector so as to change the shape, position, and/or orientation of all or a portion thereof with respect to the incoming stream, for deflecting and guiding the stream in a desired manner downwardly toward the floor or bale immediately in advance of the packer apparatus. Exemplary biasing elements are springs such as coil springs attached to fixed structure and extendable in tension with movement of the deflector toward one end or the other of the chamber, to exert a force against a portion or portions of the deflector for altering a shape and/or orientation of the deflector for directing the stream of biomass in the desired manner.

As further explanation, the incoming stream of biomass will have greater propulsion force closer to the inlet into the chamber, and less force farther from that point. The deflector will be closer to the inlet when at one end of the chamber, and farther away when at the opposite end. When at the closer end, the deflector will be required to deflect the more forceful stream downwardly, and will be configured in one manner for that purpose, and in another manner at the farthest point from the inlet, and will be configured in a range of manners between those for the closest and farthest positions, respectively.

As a non-limiting example, a radius of curvature or angle for the deflector can be varied as a function of the horizontal position between the ends of the chamber, and/or the vertical position of the packer apparatus within the chamber.

As an exemplary embodiment, the deflector can comprise an upper portion of a hard or rigid material such as sheet metal. The upper portion can have a concave, curved, or angled shape when viewed from the side, so as to be capable of deflecting the biomass stream from a generally horizontal or slightly upward or downward trajectory, to a substantially vertical downward trajectory, including to redirect the stream somewhat opposite the incoming direction when close to the end of the chamber closest to the inlet. The upper portion of the deflector positioned to be directly impinged by the incoming biomass stream will also preferably have a convex curved or V-shape when viewed from above, so as to deflect portions of the impinging biomass in opposite sideward directions and spread the stream largely evenly from side to side. As a result of the combination of the concave side profile and V-shaped or convex upper profile, the incoming flow will be deflected downwardly and to the sides, in a manner so as to be distributed largely evenly from side to side on the floor or previously compacted biomass. Additionally, the biasing element or elements in connection with the upper portion of the deflector will exert a biasing force against the deflector, that can cooperate with the force exerted against the deflector by the impinging stream, to displace and/or deform the deflector, for a desired effect, particularly, to better direct the stream to the desired location in advance of the moving rollers.

The lower, flexible portion of the deflector comprising the flexible tarp or sheet, is configured to guide the stream of biomass downwardly during the end to end movement in a manner to deliver the biomass evenly across the path of the packer apparatus. Because of the flexibility, the tarp or sheet will absorb some of the energy of the biomass, to slow it and reduce the impact forces against the floor or already compacted biomass.

According to another preferred aspect of the invention, the packer apparatus comprises a set of rollers extending across the chamber having vertically coextensive bottom portions configured for rolling over an upper surface of the bale for imparting a substantially flat shape thereto. Opposite end ones of the rollers have a diametrical extent substantially smaller than a diametrical extent of a middle one of the rollers, so as to be capable of imparting the flat shape to portions of the upper surface of the bale adjacent to the ends of the chamber. As an optional feature, the packer apparatus can comprise a frame in connection with and supporting the rollers that is tiltable when the underlying compacted biomass is not parallel with the floor, and the tilt can be sensed to signal the condition to the controller or operator for corrective or other action. A level sensor or sensors can also be provided, to enable determining a direction and extent of tilt of the harvester and/or packer frame, and the packer responsively operated, for instance, to take steps to avoid and correct any resulting unevenness in the compacted biomass.

As an additional, optional aspect of the invention, the biomass can be carried on a conveyor extending through or above an upper region of the compacting chamber and of variable length, operable to extend and retract so as to follow the end to end movements of the packer apparatus and deflector. As a result, the distance that the biomass will be airborne before impinging the deflector will be substantially constant, which may be advantageous for some applications. The conveyor may also require less power than a blower.

BRIEF DESCRIPTION OF THE DRAWINGS

FIG. 3 is a simplified fragmentary side view of elements of the apparatus of the invention configured in one manner;

FIG. 4 is another simplified fragmentary side view of elements of the apparatus of the invention configured in another manner;

DETAILED DESCRIPTION OF THE INVENTION

Figure 1:
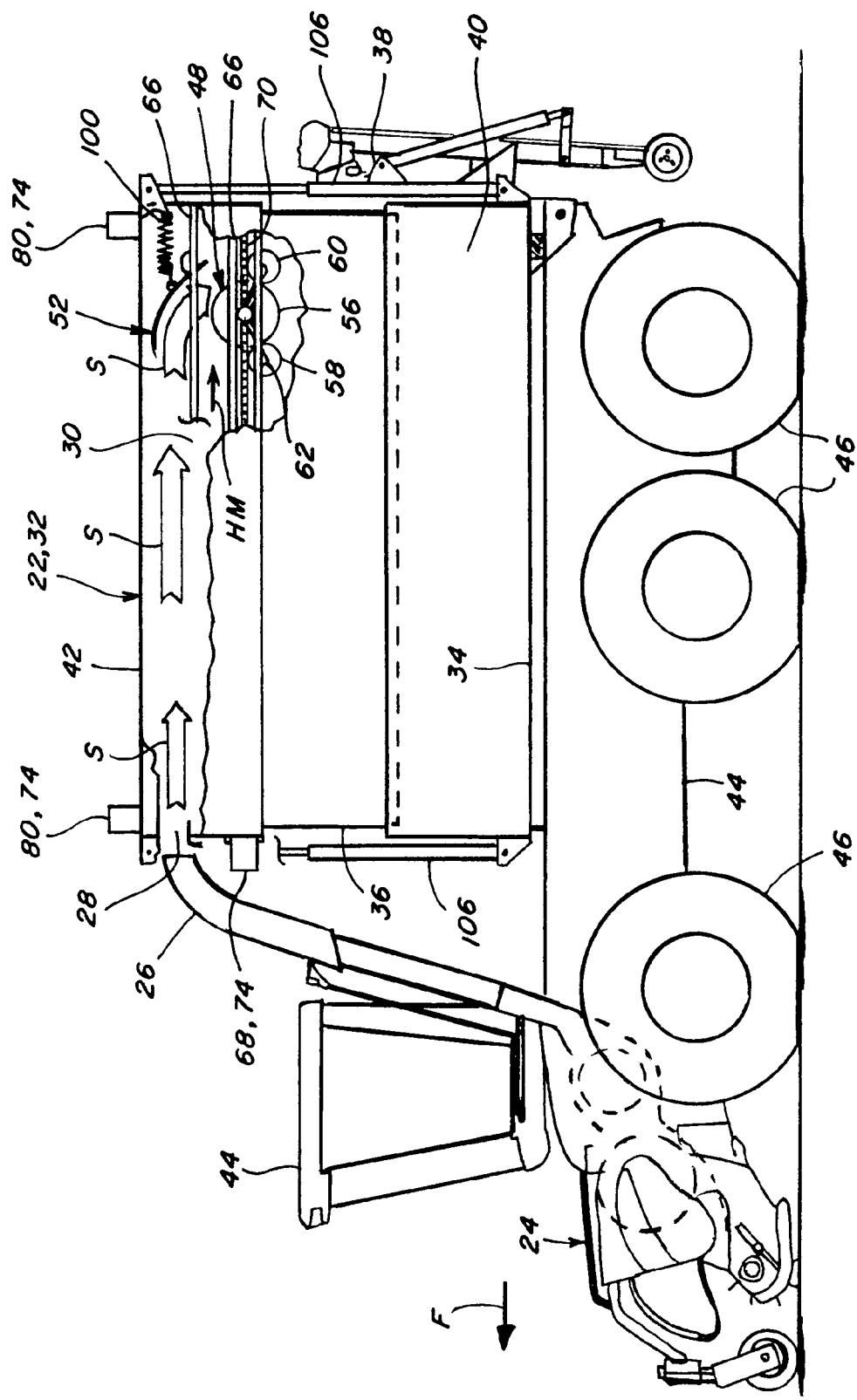
FIG. 1 is a side view of a biomass harvester including apparatus of the invention for compacting biomass into uniformly compacted unitary bales according to the invention.

Referring now to the drawings, FIG. 1 depicts a self-propelled biomass harvester 20 including an on-board apparatus 22 constructed and operable according to the invention for collecting and compacting the biomass into uniformly compacted unitary bales, and discharging or unloading the bales onto the ground or another surface, or another vehicle such as a self-propelled bale handler, trailer, wagon, truck, or the like, as harvester 20 moves in a forward direction F over a field. Harvester 20 here is configured to include apparatus 24 on a forward end thereof, of conventional construction and operation for picking up previously cut biomass and propelling a stream of the biomass upwardly and rearwardly through a duct 26 and discharging the stream of biomass rearwardly at high speed through an inlet 28 into a compacting chamber 30 of apparatus 24, as denoted by arrows S. Apparatus 24 can include a variety of rotary rakes, choppers, impellers, and the like, for collecting; chopping and/or cutting the biomass to a desired consistency; and propelling the stream of the biomass into chamber 30 at the desired velocity. In this regard, the biomass can comprise any desired agricultural or forestry plant material, including, but not limited to, sugar cane, corn, grasses such as switch grass, or cotton, and harvester 20 can include appropriate apparatus for cutting, gathering, and/or picking up that material and propelling or conveying a stream of the material into chamber 30.

Compacting chamber 30 is part of a bale forming structure 32 of apparatus 22, and is defined on the bottom by a floor 34; at the forward end by an upstanding forward wall 36; at the rear end by an upstanding unloading door 38; on the opposite sides by upstanding side walls 40; and on top by a roof 42. Here, bale forming structure is supported on a frame 44 of harvester 20, which carries an operator cabin 44, an engine and a drivetrain (not shown) connected in driving relation to wheels 46 that support harvester 20 for movement over the ground and other surfaces. Floor 34 will be of suitable rigid construction, and will include apparatus for unloading of a bale therefrom, as will be explained. Forward wall 36 and side walls 40 will also be of suitable rigid construction. As a non-limiting example, they can be of sheet metal, and can be fixed, or vertically movable, such as of telescoping construction, as desired or required for vertically compacting for road travel and the like. And upper region of structure 32 can be of wire cloth or sheet construction, and can be rigid or collapsible as desired or required for a particular application.

Figure 2:
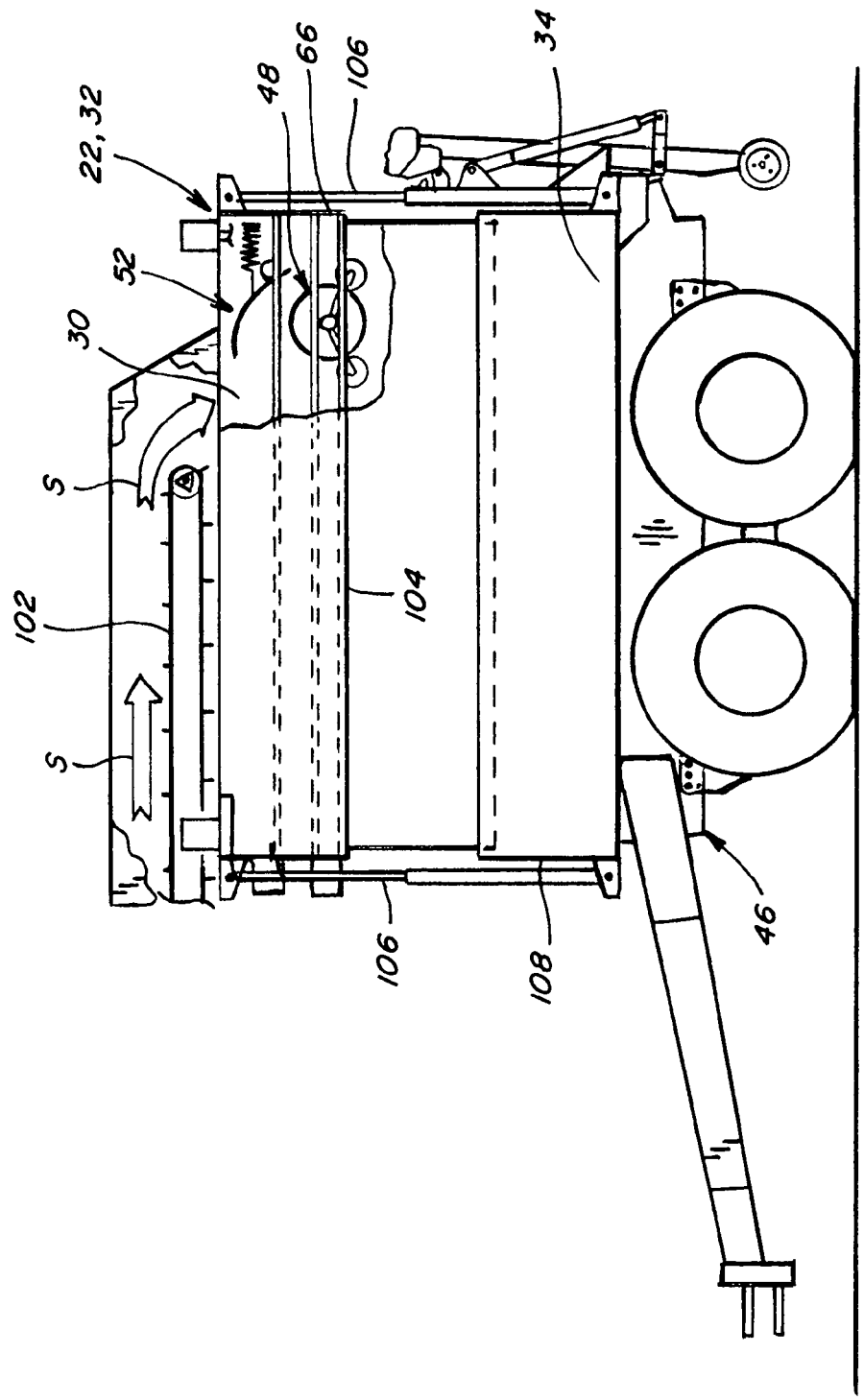
FIG. 2 is a side view of a trailer including apparatus of the invention for compacting biomass into uniformly compacted unitary bales according to the invention.
Figure 5:
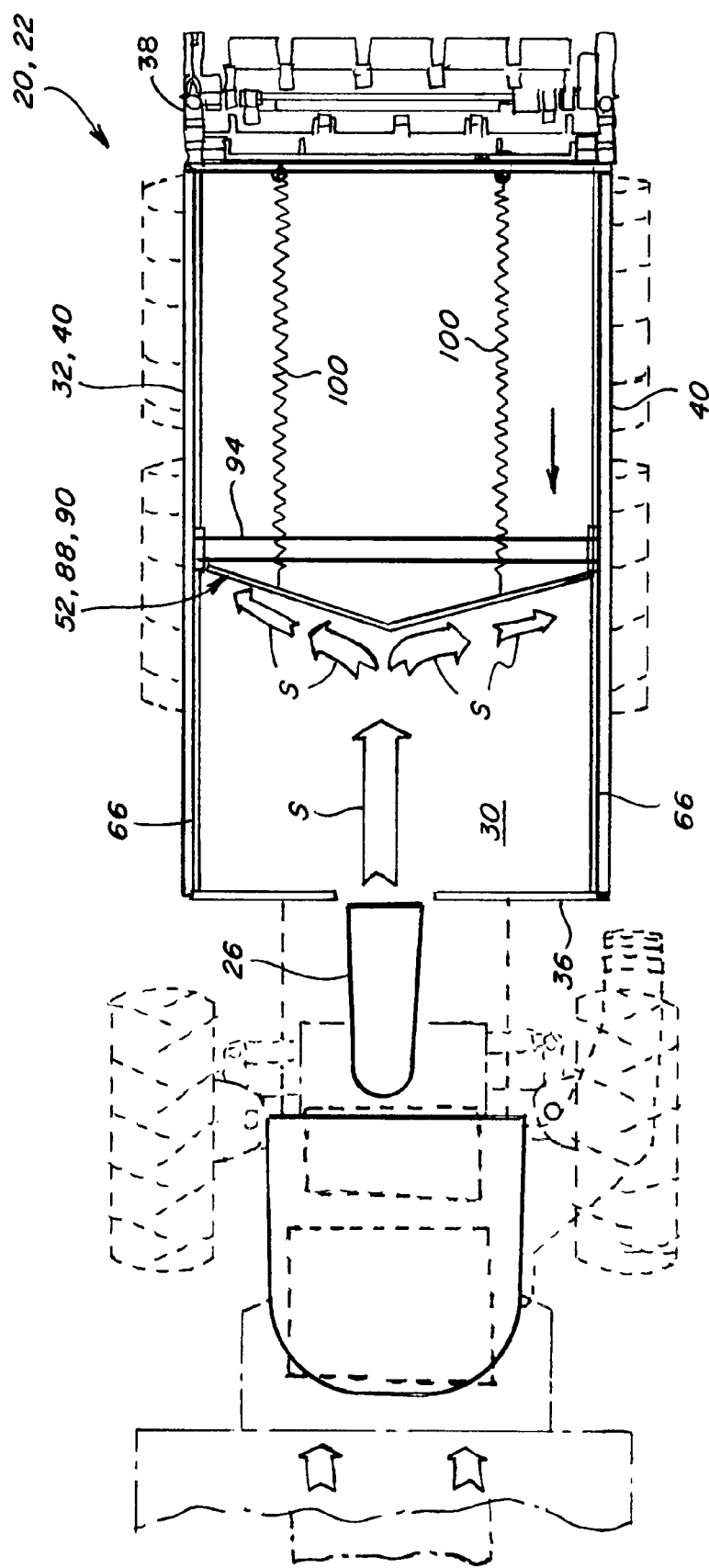
FIG. 5 is a simplified fragmentary top view of the harvester of FIG. 1, illustrating aspects of the invention.
Figure 6:
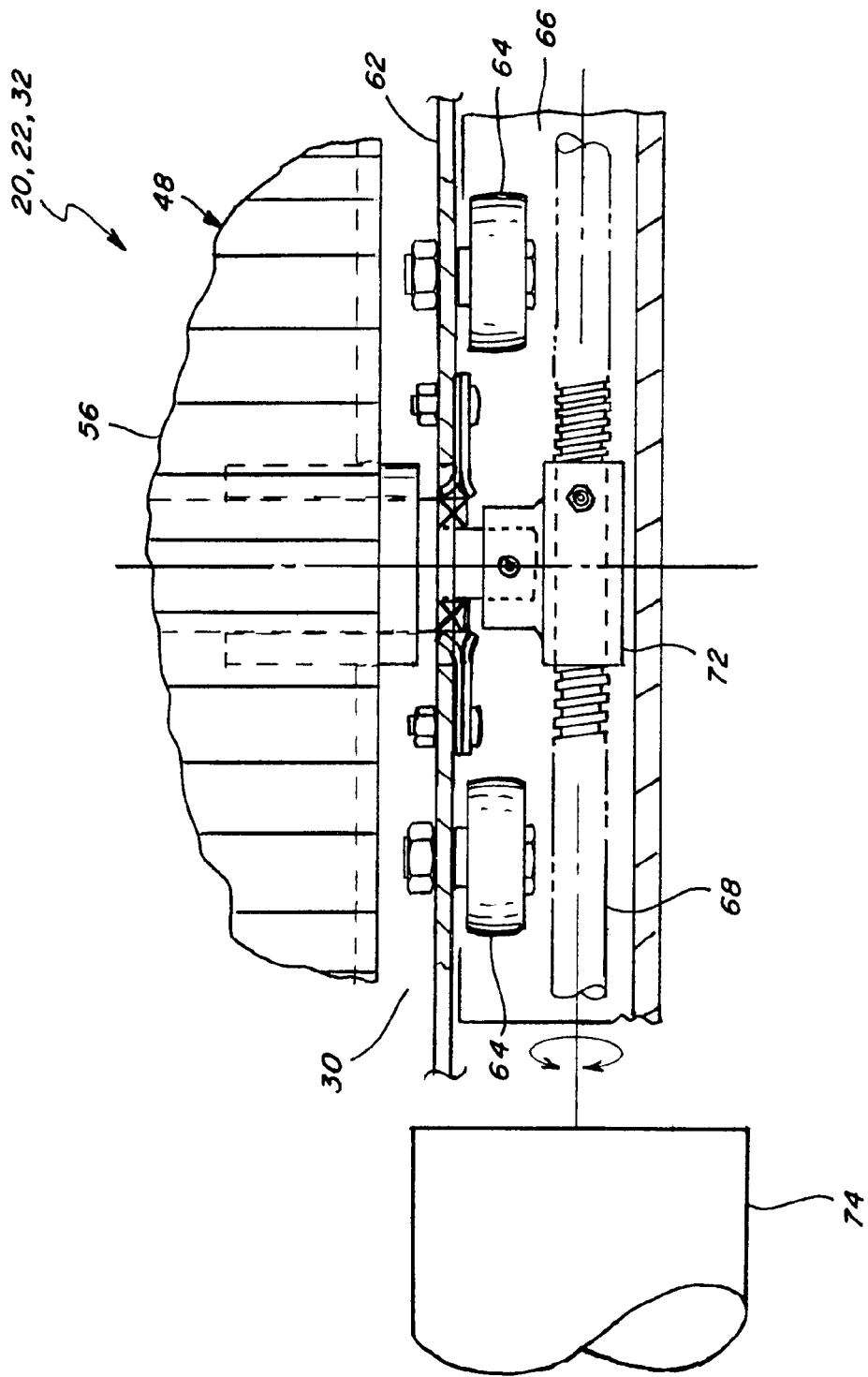
FIG. 6 is an enlarged fragmentary top view of aspects of the invention.
Figure 7:
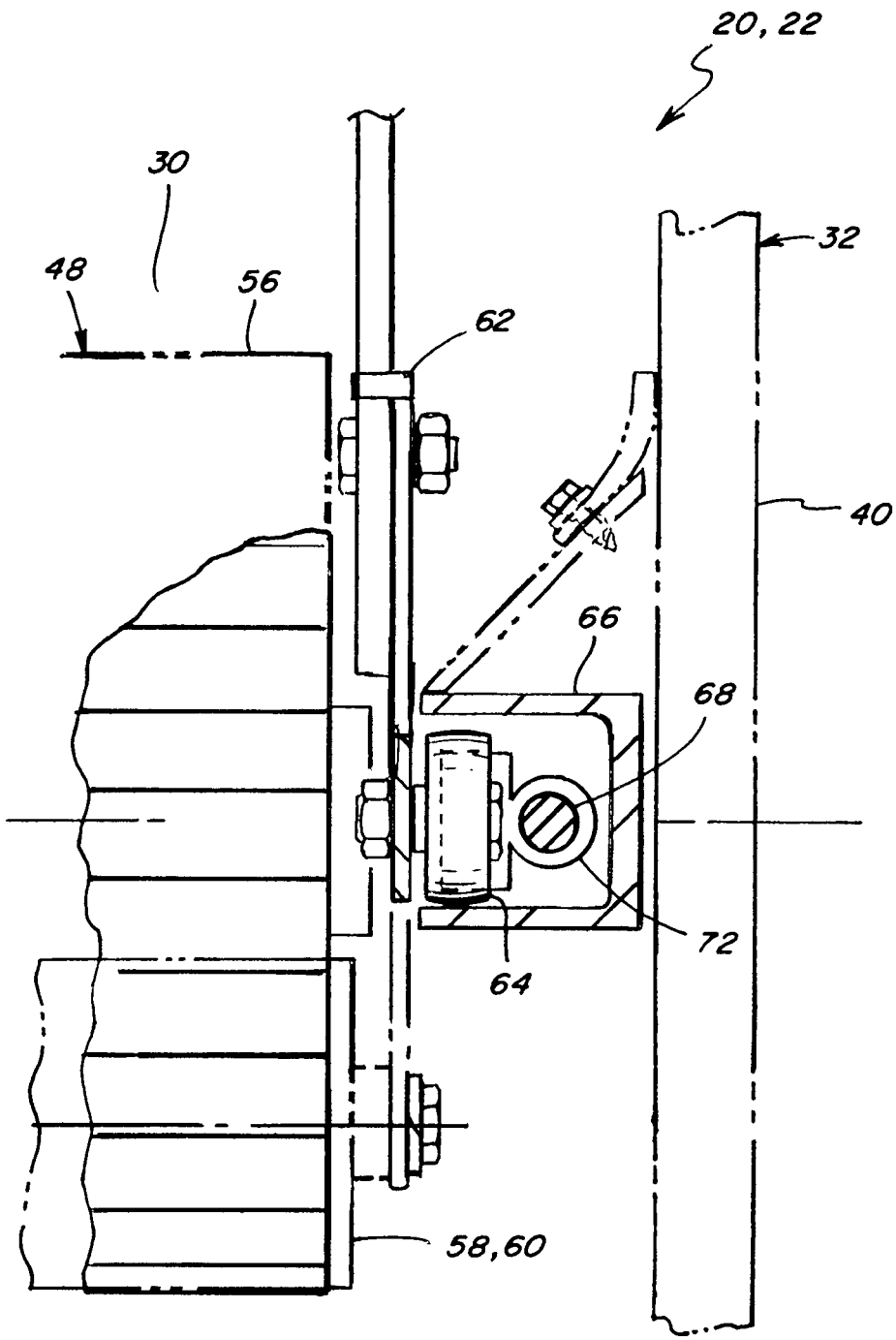
FIG. 7 is an enlarged fragmentary end view of aspects of the invention.

Referring also to FIG. 2, as an alternative mobile platform for apparatus 22 and structure 32, they can be carried on or configured as a towable vehicle or trailer 46, for towing behind a harvester for receiving a stream of biomass therefrom in the above described manner. It is anticipated that trailers such as trailer 46 would meet the needs of e.g., the sugar cane market. A trailer may also be towed by a forage harvester for use with that material.

Referring also to FIGS. 3-9, apparatus 22 includes packer apparatus 48 configured and supported in chamber 30 for reciprocating movement over floor 34 between the end enclosed by forward wall 36 and the end enclosed by door 38, as denoted by arrows HM, and progressive movement upwardly within the chamber, denoted by arrow VM, for uniformly compacting the received biomass against floor 34 and into a unitary bale 50. A crop deflector 52 is supported in chamber 30 above packer apparatus 48 for deflecting the stream of biomass downwardly and will move with packer apparatus 48 horizontally, but remains at a fixed elevation. Crop deflector 52 is configured and operable so as to move continuously with packer apparatus 48 between the ends of chamber 30, and to substantially constantly reconfigure during that movement as a function of the position of packer apparatus 48 and a direction of the horizontal movement thereof, so as to deflect the stream of the biomass directly in the path of packer apparatus 48 in its current direction of horizontal movement HM, such that the biomass will be immediately compacted by apparatus 48 onto floor 34 or bale 50. In this regard, FIG. 3 illustrates horizontal movement HM in the forward direction, and FIG. 4 illustrates horizontal movement HM in the rearward direction.

As an advantage, stream S of the biomass is continuously and immediately compacted into bale 50, such that each successive layer of the bale will be flat and of uniform density. As another advantage, there will be less tendency for the biomass to slide down the upper surface of bale 50 during travel on hills, and accumulate or build up at one end or the other of chamber 30, or at one side or the other. In this regard, the term "path of packer" apparatus 30 should be understood to include that portion of the packer apparatus facing in the direction of horizontal movement thereof, in addition to an upper surface 54 of bale 50 over which the packer apparatus is to immediately pass.

Packer apparatus 48 includes a set of rollers, here including a middle roller 56 having a larger diameter, and end rollers 58 and 60 on opposite sides of middle roller 56 having smaller diameters. Rollers 56, 58 and 60 extend substantially across the width of chamber 30, and have vertically coextensive bottom portions configured for rolling over upper surface 54 of a bale 50, for imparting a substantially flat shape thereto. Here, as a non-limiting example, middle roller 56 will be constructed of a suitable rigid material, such as steel or aluminum, and have a diameter which will be at least about twice the diameter of rollers 58 and 60. Middle roller 56 can also have a corrugated outer surface for contacting the biomass. As an advantage, use of smaller end rollers enables imparting the desired flat shape to surface 54 of bale 50, including closely adjacent to forward wall 36 and door 38, without requiring passage of the rollers beyond bale 50 as can be observed to be required with the larger single rollers utilized in older stack forming devices referenced above.

The opposite ends of rollers 56, 58 and 60 will be supported for horizontal rolling movement HM and vertical movement VM, by suitable side frames, such as frame 62 illustrated. Frames 62 can be of welded, stamped or cast construction, and should be capable of supporting the rollers and transferring a downward force thereto from associated drive elements sufficient for achieving desired compaction of the biomass. Frames 62 each include guide rollers 64 carried on or received in horizontal rails 66 (FIGS. 3, 4, 6, and 7) extending along side walls 40 between forward wall 36 and unloading door 38, for end to end horizontal movement HM of rollers 56, 58 and 60 within chamber 30. Rails 66, in turn, are supported for vertical movement in their horizontal orientation upwardly and downwardly beside or with side walls 40 (e.g., if telescoping or otherwise vertically movable) for effecting the vertical movement VM of packer apparatus 48, which can occur at the ends of, or during, the horizontal movements, as desired or required for a particular application.

Suitable horizontal drives 68 are provided to effect the horizontal movements HM of packer apparatus 48 along rails 66. As one non-limiting example, drives 68 can each comprise a linear screw drive including a threaded screw 70 supported along each rail 66, for rotation about a longitudinal axis through the screw, and a nut 72 which threadedly receives screw 70 or has recirculating ball bearings engaged therewith, and is affixed to the respective frames 62, such that rotation of the screw 70 will effect longitudinal movement of the associated frame 62 and rollers 56, 58 and 60 within chamber 30. Screws 70 can be protected from shock loads and vibration by suitable isolators such as resilient bushings or springs. Suitable deflectors or shields can also be provided to protect the screws from the plant material and dust. Drives 68 will include suitable power sources for rotating screws 70, such as one or more motors 74 which can be fluid or electric powered as desired. Power will be supplied by the harvester 20, or if located on a trailer 46, by the towing vehicle, via suitable fluid or electrical lines and connections, in the well known manner, as illustrated by fluid lines 76 and 78. Synchronization of operation of the drives 68 can be achieved with suitable mechanical devices such as a connecting cross shaft or chain, or electrical devices such as rotary or linear transducers or resolvers, or the like, in the well known manner. Such transducers, limit switches, or the like, and associated circuitry, including a processor or controller, can be used to automatically control the speed and direction of horizontal movement, as desired.

As an alternative, drive 68 can comprise a gear drive including a motor or motors 74 carried on one or both frames 62, and having a gear on an output shaft of the motor enmeshed with a rack extending parallel with rail or rails 66, such that rotational of the motor will turn the gear or gears to move the packer apparatus along the rails. Cables and pulleys could also be used.

Figure 8:
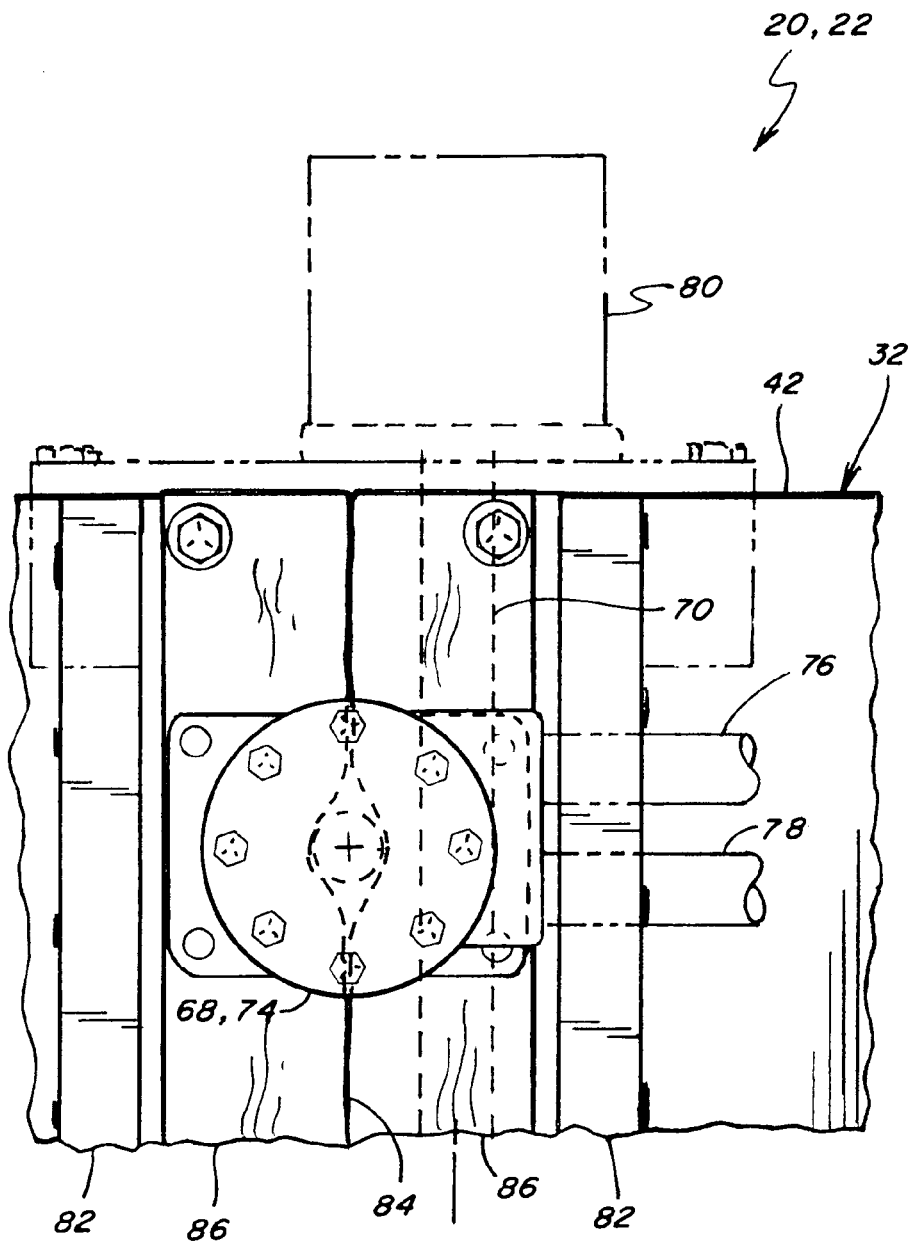
FIG. 8 is another enlarged fragmentary end view of aspects of the invention.
Figure 9:
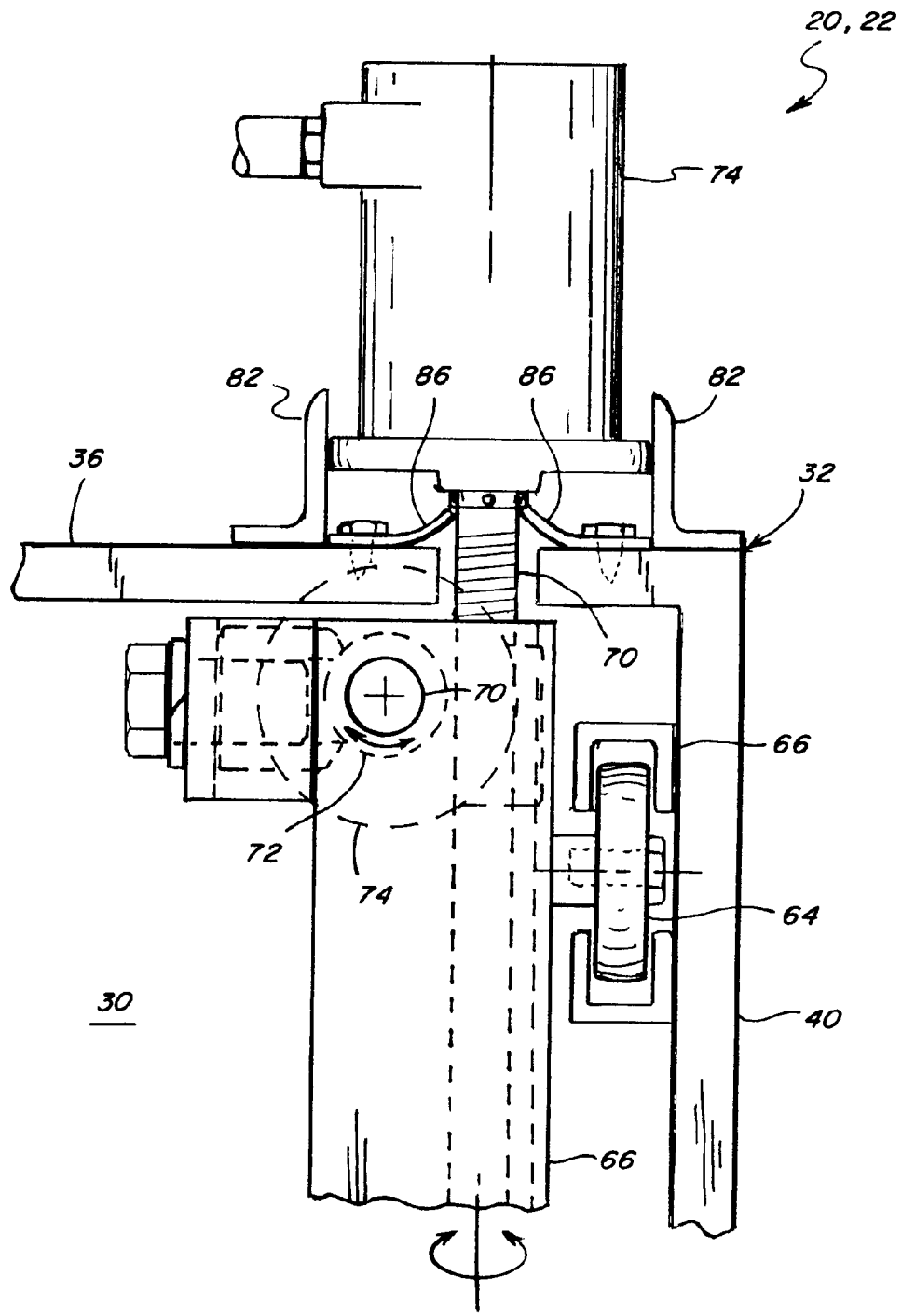
FIG. 9 is an enlarged fragmentary top view of aspects of the invention.
Figure 10:
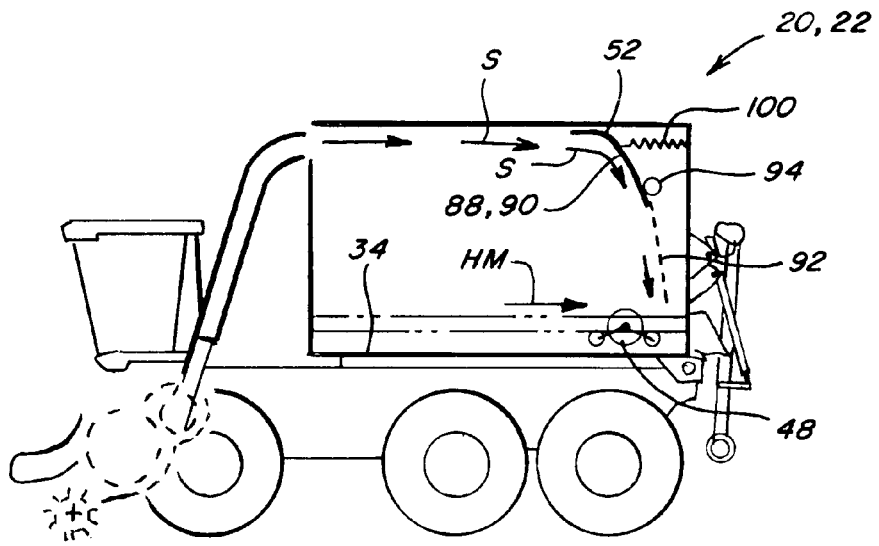
FIG. 10 is a simplified side view of the harvester, illustrating aspects of the invention in one operating configuration.
Figure 11:
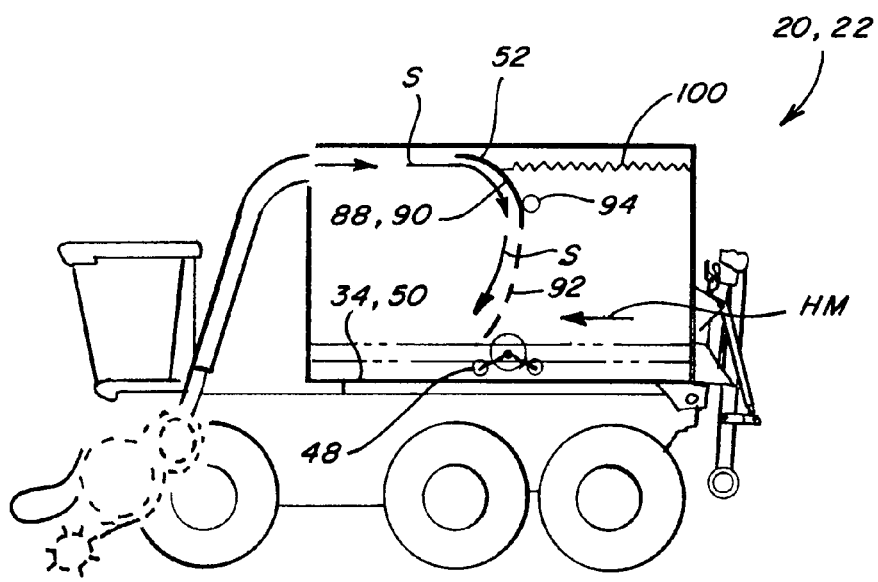
FIG. 11 is another simplified side view of the harvester, illustrating the aspects of the invention in another operating configuration.
Figure 12:
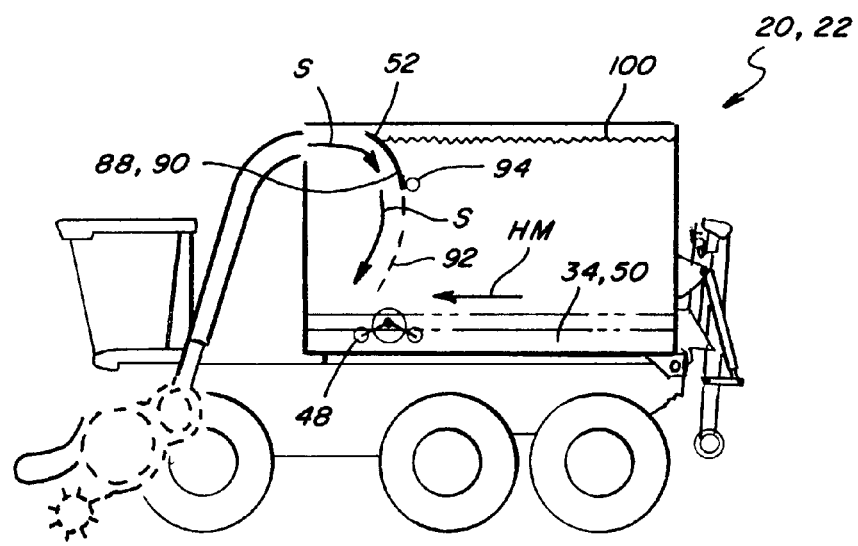
FIG. 12 is another simplified side view of the harvester, illustrating the aspects of the invention in another configuration.
Figure 13:
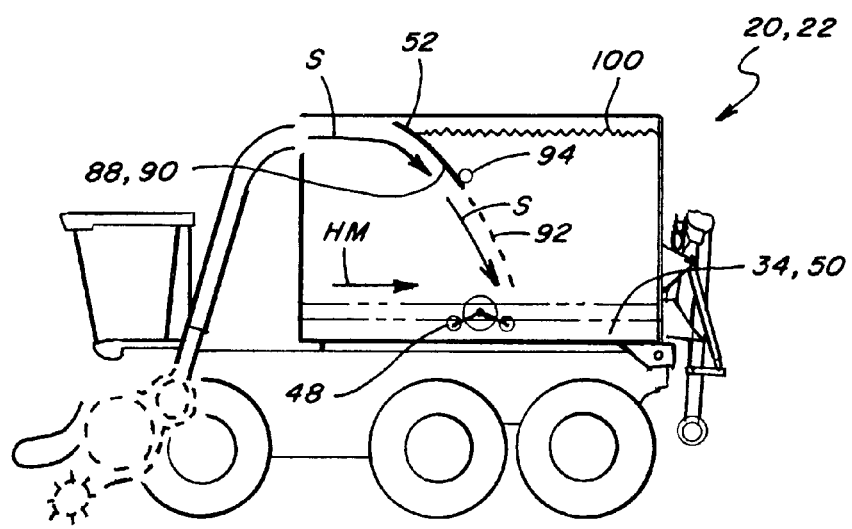
FIG. 13 is another simplified side view of the harvester, illustrating the aspects of the invention in another configuration.

Packer apparatus 48 is essentially carried on rails 66 and thus will be moved upwardly and downwardly by raising and lowering rails 66, which is accomplished using suitable vertical drivers 80. As a non-limiting example, drives 80 can again include linear screw drives, which will be disposed in a vertical orientation along or at the ends of walls 40. As illustrated in FIGS. 8 and 9, drives 80 will preferably include screws 70 mounted vertically in or on structure 32 for rotation about longitudinal axes through the respective screws, and rotatable by suitable motors 74, powered by a suitable power supply, again via lines 76 and 78 in the well known manner. Nuts 72 of vertical drives 80 are connected to the respective ends of rails 66 and are threadedly disposed about and engaged with vertical screws 70 of the drives, and will be moved upwardly or downward by the rotation to correspondingly move packing apparatus 48 upwardly and downwardly within chamber 30. The vertical movements can be guided by suitable apparatus including internal vertical rails 66 and guide rollers 64 located in chamber 30 (FIG. 9), and/or external guide rails 82 disposed about the exteriors of motors 74 for also preventing rotation thereof (FIGS. 8 and 9). Screws 70 can be protected from shock loads and vibration by suitable isolators such as resilient bushings or springs. Suitable deflectors or shields can also be provided to protect the screws from the plant material and dust. Slitted rubber boots 86 can be provided in slots 84 for passage of the horizontal screws 70, to prevent loss of biomass therethrough. Again, synchronization of operation of the drives 80 can be achieved with suitable mechanical devices such as a connecting chain, or electrical devices such as rotary or linear transducers or resolvers, or the like, in the well known manner. Operation of drives 80 can also be automatically controlled in a desired manner for upward progressive movement using a processor or controller, to achieve the desired degree of compaction of the biomass.

Alternative vertical drives 80 can include a variety of options, including linear actuators, fluid cylinders, rack and pinions, or a cable system with pulleys and/or turnbuckles or the like. Non-limiting examples include both standard and telescoping fluid cylinders, and fluid cylinder or linear actuator operated scissors mechanisms. Optionally, frames 62 can be configured to allow tilting, such that if upper surface 54 becomes out of parallel with floor 34, this can be indicated by associated sensors to the controller or operator and corrective action taken if desired or required.

Referring also to FIGS. 10, 11, 12, and 13, crop deflector 52 of apparatus 22 of harvester 20 has a crop deflecting surface 88 positioned and configured to be impinged by stream of the biomass S, so as to deflect and guide the stream downwardly toward floor 34 or bale 50 in advance of packer apparatus 48, or onto surfaces of packer apparatus 48 facing in the direction of horizontal movement HM thereof, such that the biomass will be immediately compacted onto the floor or into the bale by the packer apparatus. This capability is achieved by moving crop deflector 52 essentially with packer apparatus 48 horizontally, and reconfiguring crop deflecting surface 88 during the movement, preferably as a function of the position of the packer apparatus.

Structurally, crop deflecting surface 88 of deflector 52 preferably has an upper portion 90 of a hard or rigid material such as sheet metal, positioned to be directly impinged by stream S. Upper portion 90 here has a concave, curved shape when viewed from the side, oriented to direct biomass stream S downwardly. Upper portion 90 has a convex curved or V-shape when viewed from above (FIG. 5), so as to deflect portions of stream S in opposite sideward directions for spreading the stream largely evenly from side to side. A lower portion 92 comprises a flexible roll up tarp or sheet, preferably of a durable rubbery or canvas material, biased toward the retracted or raised position, by a spring operated retractor mechanism 94. A bottom portion 96 of lower portion 92 is connected to packer apparatus 48, by linkages 98, as illustrated in FIGS. 3 and 4. As a result, lower portion 92 will automatically roll out when packer apparatus 48 is farther from the upper end of deflector 52, and retract when closer to the upper end.

Upper portion 90 of crop deflector 52 is configured to change shape and/or orientation as the deflector moves with packer apparatus 48. To achieve this, biasing elements 100 comprising coil springs are preferably connected between upper portion 90 and a fixed element at the rear of structure 32, so as to exert a rearward force FS1 against the deflector, as illustrated in FIGS. 3 and 4. At the same time, stream S will exert a force FS2 against the deflector. As deflector 52 moves forwardly, force FS1 will increase as a function of the spring constant and extension of biasing elements 100. Force FS2 will also increase, because the force of stream S will be stronger closer to inlet 28. As a result, both forces acting against deflector 52 will increase with displacement toward the forward end of the chamber, and will cause the orientation and/or shape of crop deflecting surface 88 to change in a manner to deflect stream S more forwardly when closer to forward wall 36, and more rearwardly closer to unloading door 38. If it is desired for this to be effected by a change in the shape of surface 88, deflector 52 can be constructed so as to be hard but sufficiently flexible to deform under forces FS1 and FS2. As a non-limiting example, a radius of curvature or angle of surface 88 can vary as a function of the forces. As another example, the attachment points of biasing elements 100 can also be selected to facilitate this or the reorienting of the deflector. As another option, the shape and/or angle of deflector 52 can be varied side to side, to compensate for other factors and/or conditions, such a side tilt resulting from travel on a hillside.

Additionally, lower portion 92 of deflector 52, because of its flexibility, will be deformed at least somewhat by a force FS2 exerted by stream S, and thus will absorb some of the energy of the biomass, to slow it and reduce the impact forces against the floor or bale 50.

Crop deflector 52 can be supported in the upper region of chamber 30 for the horizontal movement, in a variety of manners. As a non-limiting example, additional rails 66 can be provided along the upper regions of sidewalls 40, and can support upper portion 90 via additional guide rollers 64. Movements of deflector 52 can be via an additional horizontal drive or drives 68, or by connection with packer apparatus 48, such as by upstanding telescoping or folding arms or linkages. If separate horizontal drives 68 are used, their operation can be controlled via a suitable controller, to position deflector 52 in desired relation to the packer apparatus, such as, just forwardly thereof when toward the rear of the chamber, and more rearwardly in relation thereto when in the forward region, to effect the desired redirection of flow S.

Referring again to FIG. 2, as an additional, optional aspect of the invention, the biomass can be carried on a conveyor 102 extending through or above an upper region of compacting chamber 30 and of variable length, operable to extend and retract so as to follow the end to end movements of packer apparatus 48 and deflector 52. As a result, the distance that the biomass will be airborne before impinging deflector 50 will be substantially constant, which may be advantageous for some applications. As an alternative construction of bale forming structure 32 as also shown in FIG. 2, rails 66 can be affixed to vertical side wall segments 104 movable vertically and used as dead weights to pack the biomass and save packing power (they can be ballasted if necessary in case of biomass that requires heavy load for optimum compaction). Fluid cylinders 106 are provided in connection with the side wall sections and are extendable and retractable for controlling the height of the wall and act as compressing devices. As an example wall structure for this, side walls 40 can be made with three sections that telescopically retract or fold while being at the bottom position (a one-section tall wall would touch the ground at bottom position). Side wall sections 104 are moved using fluid cylinders 106 that create also down pressure for packing purposes. This system can also be used on harvester 20, as illustrated by cylinders 106. The lower wall sections 108 are fixed, e.g., by welding in place and with floor 34 are sealed so that any juice or other fluid of the biomass will not escape. A gutter is located at the bottom (space in between floor beams) so the juice can accumulate in a reservoir, and can optionally be evacuated later while unloading the bale (if the juice is desired to be kept by the processing plant). The harvester could be equipped with a liquid unloading system (auger or pump) that can transfer the juice to a trailer/reservoir, stationary or on the go.

The juice or liquid residues could also be unloaded separately (in case of silage) or kept open so the juice will be dropped on the ground continuously during harvesting. An upper wall section can be of foldable or roll up net construction, e.g., screen, fabric, to accommodate upward and downward movements of segments 104 to avoid crop losses when the side wall are down (example: if a forage harvester is blowing straw in the trailer, the net will keep the chaff inside). The net is linked to the top of the side wall and will retract upwardly as the side wall is moving up.

Figure 14:
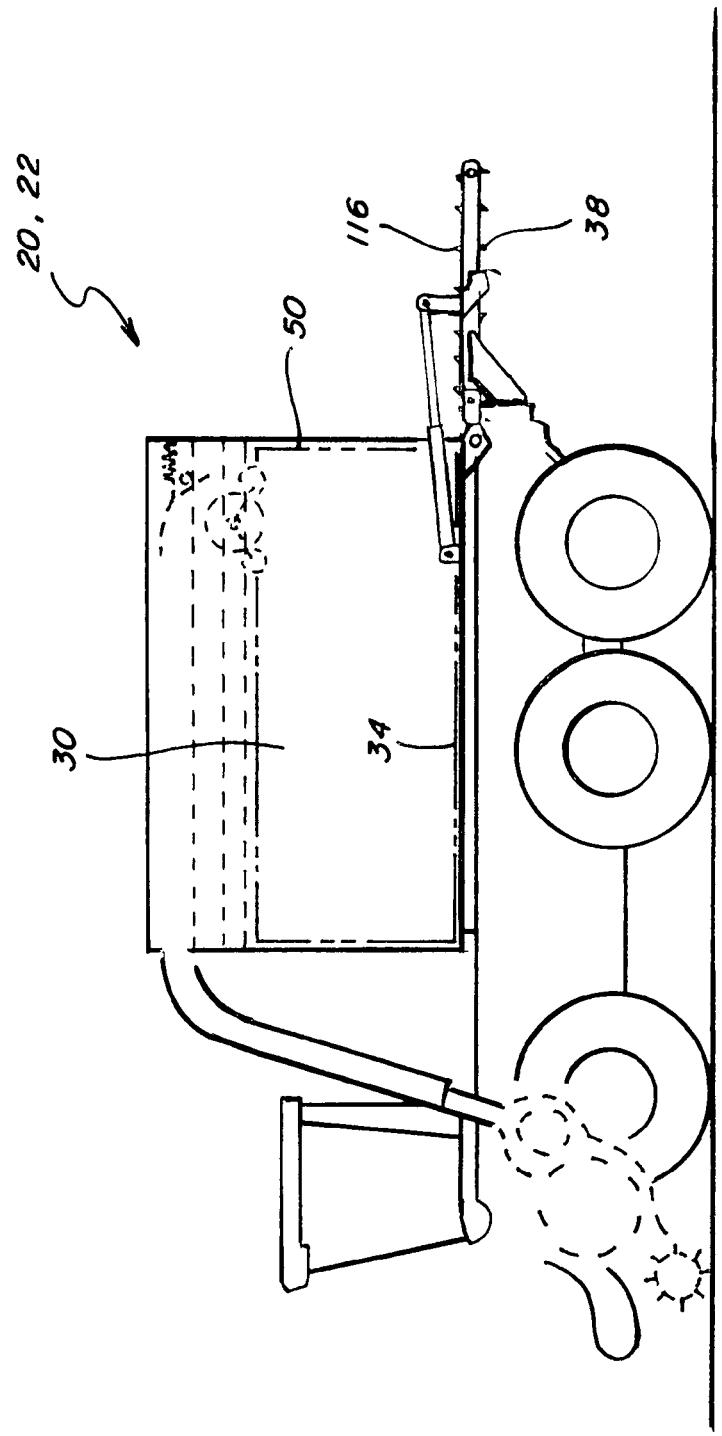
FIG. 14 is another simplified side view of the harvester, illustrating unloading elements thereof.
Figure 15:
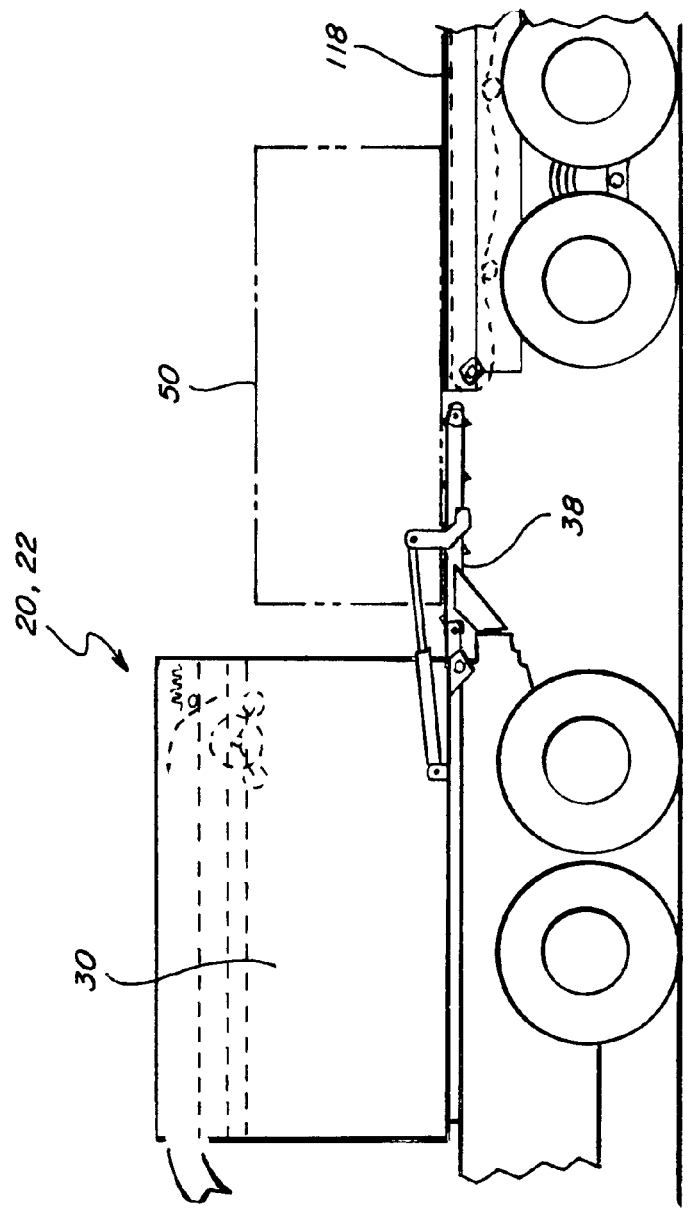
FIG. 15 is a fragmentary simplified side view of the harvester, illustrating unloading of a bale onto an accompanying truck.
Figure 16:
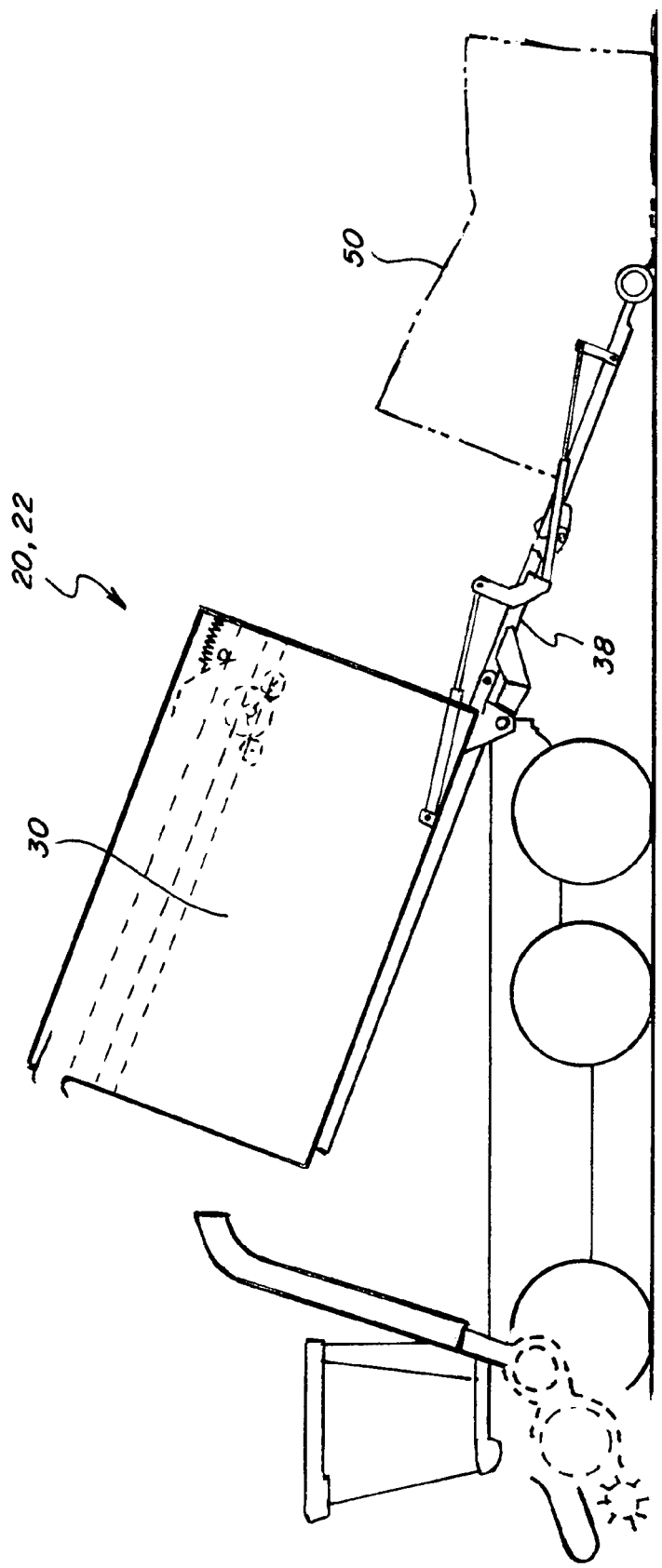
FIG. 16 is another simplified side view of the harvester, illustrating unloading of a bale onto the ground.

Referring also to FIGS. 14, 15 and 16, bales 50 can be evacuated using hydraulically driven hay dogs or moving belts 116 at the bottom (of chamber 30, incorporated into floor 34, and/or by tilting structure 32 (FIG. 16) in the manner of well known cotton packagers. As a non-limiting example, it is contemplated that three bales 50 can be carried on a 48 foot long truck, with a gross weight of the bales of approximately 38,500 lbs, which is maximizing the load (important for road regulation). Sugar cane billets and relatively light crops are desired markets for the present invention, but also silage is a desired market (smaller bales) that can be unloaded in a bunker silo as bales and help decrease the usual conventional packing method going back and forth with a heavy tractor. In the case of silage, apparatus 22 is contemplated to replace the usual (unpacked) forage wagons or trucks (where the forage harvester blows chopped forage) with a smaller vehicle creating compacted bales. Bales would be smaller than 8 feet×8 feet×16 feet (250×250×500 cm) because of higher moisture content and heavy load. In the case of forestry residues, the chopped wood chips would be blown inside compaction chamber 30 and packed as a bale instead of collected in an uncompressed state.

It is contemplated that users will have at least three options for unloading bales 50 from apparatus 22 of harvester 20:

1. Open unloading door 38 and unload the bale horizontally and load it directly onto or into a truck 118 preferably having sides so as reduce loss of biomass (or any modified vehicle able to handle such bale) (FIG. 14).
2. Open door 38 and dump the bale on the ground (as an example in a silage bunker) (FIG. 15).
3. Open door 38, wrap the bale and/or unload it on a open-bed truck 118 or drop it on the ground. The end results is the bale will move from the harvester to the truck with a very high crop density versus chopping/ blowing in a truck or chopping/unloading in a truck at the end of the field. This baling process can be used in collaboration with a wrapping system.

In light of all the foregoing, it should thus be apparent to those skilled in the art that there has been shown and described a novel apparatus for forming a compacted unitary bale of agricultural or forestry biomass. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. Apparatus for forming a compacted unitary bale of agricultural or forestry biomass, comprising:
   a mobile structure having a floor and upstanding walls defining a compacting chamber, and an inlet in an upper region of one end of the structure configured for receiving a substantially continuous stream of the agricultural or forestry biomass for flow along a path through the chamber from the one end toward a second end opposite the one end;
   packer apparatus configured and supported in the chamber for reciprocating movement through the chamber between the one end to the second end and progressive movement upwardly within the chamber, for compacting the biomass against the floor for forming the bale;
   a crop deflector supported in the chamber above the packer apparatus for deflecting the stream of the biomass downwardly;
   characterized by the crop deflector being configured and operable so as to move continuously with the packer apparatus between the ends of the chamber and to substantially constantly reconfigure as a function of a position of the packer apparatus and a direction of the movement thereof so as to deflect the stream of the biomass directly a path of the packer apparatus in the current direction of the movement thereof so as to be immediately compacted thereby onto the floor or the bale; and
   further characterized by the crop deflector having a crop deflecting surface positioned and configured to be impinged by the stream of the biomass and to deflect and guide the stream downwardly, and wherein the reconfiguring of the crop deflector comprises changing a vertical extent of the crop deflecting surface;
   wherein the crop deflecting surface is extendable and retractable for changing the vertical extent thereof.

2. Apparatus of claim 1, wherein the position of the packer apparatus comprises a vertical position thereof.

3. Apparatus of claim 1, wherein the position of the packer apparatus comprises a horizontal position thereof.

4. Apparatus of claim 1, wherein the crop deflector comprises a roll up tarp.

5. Apparatus of claim 4, wherein the crop deflector comprises apparatus biasing the tarp toward a retracted condition.

6. Apparatus of claim 1, further characterized by the crop deflector having a crop deflecting surface positioned and configured to be impinged by the stream of the biomass and to deflect and guide the stream downwardly, and wherein the reconfiguring comprises changing a shape of the crop deflecting surface.

7. Apparatus of claim 5, wherein the position of the packer apparatus comprises a vertical position thereof.

8. Apparatus of claim 6, wherein the position of the packer apparatus comprises a horizontal position thereof.

9. Apparatus of claim 7, wherein the shape is a concave shape and the reconfiguring comprises changing concavity of the r p deflecting surface as a function of a position of the packer apparatus.

10. Apparatus of claim 1, further characterized by the packer apparatus comprising a set of rollers extending across the chamber having substantially vertically coextensive bottom portions configured for rolling over an upper surface of the bale for imparting a substantially flat shape thereto, and opposite endmost ones of the rollers having a diametrical extent substantially smaller than a diametrical extent of a middle one of the rollers so as to be capable of imparting the flat shape to portions of the upper surface of the adjacent to the ends of the chamber.

11. Apparatus for forming a compacted unitary bale of agricultural or forestry biomass, comprising:
   a mobile structure having a floor and upstanding walls defining a compacting chamber, and an inlet in an upper region of one end of the structure configured for receiving a substantially continuous stream of the agricultural or forestry biomass for flow along a path through the chamber from the one end toward a second end opposite the one end;
   packer apparatus configured and supported in the chamber for reciprocating movement through the chamber between the one end to the second end and progressive movement upwardly within the chamber, for compacting the biomass against the floor for forming the bale; and
   a crop deflector supported in the chamber above the packer apparatus for deflecting the stream of the biomass downwardly;
   characterized by the packer apparatus comprising a set of rollers extending across the chamber having vertically coextensive bottom portions configured for rolling over an upper surface of the bale for imparting substantially flat shape thereto, and opposite endmost ones of the rollers having a diametrical extent substantially smaller than a diametrical extent of a middle one of the upper surface of the bale adjacent to the ends of the chamber.

12. Apparatus of claim 11, further characterized by the packer apparatus being carried on vertically movable ones of the upstanding walls of the mobile structure, and the walls providing ballast for urging the packer apparatus downwardly.

13. Apparatus of claim 11, further characterized by the rollers of the packer apparatus being tiltable by contact with an upper surface of a bale oriented at an angle to the floor to indicate that the upper surface is out of parallel with the floor.

14. Apparatus of claim 11, further characterized by a middle one of the rollers being corrugated.

15. Apparatus for forming a compacted unitary bale of agricultural or forestry biomass, comprising:
   a mobile structure having a floor and upstanding walls defining a compacting chamber, and an inlet in an upper region of one end of the structure configured for receiving a substantially continuous stream of the agricultural or forestry biomass for flow along a path through the chamber from the one end toward a second end opposite the one end;
   backer apparatus configured and supported in the chamber for reciprocating movement through the chamber between the one end to the second end and progressive movement upwardly within the chamber, for compacting the biomass against the floor for forming the bale; and
   a crop deflector supported in the chamber above the packer apparatus for deflecting the stream of the biomass downwardly;
   characterized by the crop deflector being configured and operable to move continuously with the packer apparatus between the ends of the chamber, and to continuously change in shape and vertical extent as a function of a position of the packer apparatus between the ends and vertically, so as to deflect at least a substantial portion of the stream of the biomass directly in a path of the movement of the packer apparatus so as to be immediately compacted by the packer apparatus.

16. Apparatus of claim 15, wherein the shape is a concave shape which will vary in degree of concavity as a function of the position of the packer apparatus.

17. Apparatus of claim 15, wherein the crop deflector is extendable and retractable for varying the vertical extent thereof.

18. Apparatus of claim 17, wherein the crop deflector comprises a roll up tarp.

19. Apparatus of claim 4, wherein the crop deflector comprises apparatus biasing the tarp toward a retracted condition.

* * * * *